(12) United States Patent
Ham

(10) Patent No.: US 7,288,153 B2
(45) Date of Patent: Oct. 30, 2007

(54) METHOD OF FABRICATING ORIENTATION FILM FOR CRYSTAL DISPLAY DEVICE

(75) Inventor: Yong-Sung Ham, Gyeonggido (KR)

(73) Assignee: LG. Philips LCD Co., Ltd., Seoul (KR)

( * ) Notice: Subject to any disclaimer, the term of this patent is extended or adjusted under 35 U.S.C. 154(b) by 230 days.

(21) Appl. No.: 11/113,704

(22) Filed: Apr. 25, 2005

(65) Prior Publication Data

US 2005/0238821 A1   Oct. 27, 2005

(30) Foreign Application Priority Data

Apr. 26, 2004   (KR) .................... 10-2004-0028573

(51) Int. Cl.
*C30B 25/12* (2006.01)
(52) U.S. Cl. .................... 117/91; 117/92; 117/95; 117/101
(58) Field of Classification Search .......... 117/4, 117/91, 92, 95, 101
See application file for complete search history.

(56) References Cited

U.S. PATENT DOCUMENTS 5,770,826 A * 6/1998 Chaudhari et al. ..... 204/157.15

FOREIGN PATENT DOCUMENTS

| KR | 1999-0051815 | 7/1999 |
|---|---|---|
| KR | 1999-0057123 | 7/1999 |

OTHER PUBLICATIONS

Office Action dated Dec. 16, 2005 for corresponding Korean Application No. 10-2004-0028573.

\* cited by examiner

*Primary Examiner*—Felisa Hiteshew
(74) *Attorney, Agent, or Firm*—Brinks & Hofer; Gilson & Lione

(57) ABSTRACT

A method of fabricating an orientation film for a liquid crystal display device is provided. The orientation film is formed on a substrate. An ion-beam irradiation apparatus having an ion generator and a vacuum chamber having a stage on which the substrate is disposed are provided. The chamber is evacuated and an angle of the substrate having the orientation film is controlled such that the orientation film has a predetermined angle with respect to an ion beam of the ion-beam irradiation apparatus using the ion generator or the stage. The surface of the orientation film is irradiated by the ion beam. The ion beam has a predetermined intensity and dose. The substrate is subsequently heated at a predetermined temperature and time sufficient to harden a thermal polymerization functional group of the orientation layer.

33 Claims, 16 Drawing Sheets

METHOD OF FABRICATING ORIENTATION FILM FOR CRYSTAL DISPLAY DEVICE

PRIORITY CLAIM

This application claims the benefit of Korean Patent Application No. 2004-0028573, filed on Apr. 26, 2004, which is hereby incorporated by reference.

FIELD OF THE INVENTION

The present invention relates to a liquid crystal display (LCD) device, and more particularly, to a method of fabricating an orientation film for an LCD device.

DISCUSSION OF THE RELATED ART

Generally, an LCD device uses optical and electrical anisotropy of a liquid crystal to display an image. Specifically, when a voltage is applied to the LCD device, the arrangement of the molecules in the liquid crystal is changed in accordance with an intensity of the applied electric field. The LCD device displays an image by controlling light dependent upon the molecular arrangement of the liquid crystal. The LCD device includes upper and lower substrates and a liquid crystal layer interposed between the upper and lower substrates.

Hereinafter, it will be explained about the LCD device referring to FIG. 1.

FIG. 1 is a schematic view showing an LCD device according to the related art.

An LCD device 1 includes an upper substrate 3, a lower substrate 11 facing the upper substrate 3 and a liquid crystal layer 19 interposed between the upper and lower substrates 3 and 11. A color filter layer 5 and a black matrix 7 in a periphery region of the color filter layer 5 are formed on the upper substrate 3, and a common electrode 9 is formed on the color filter layer 5 and the black matrix 7. A gate line 13, a data line 15 crossing the gate line 13 to define a pixel region P, a thin film transistor T near by a crossing of the gate and data lines 13 and 15, and a pixel electrode 17 connected to the thin film transistor T and disposed in the pixel region P. Although not shown, the upper substrate 3 also includes the same pixel region P as the lower substrate 11. Generally, the upper and lower substrates 3 and 11 may be referred as color filter and array substrates, respectively.

The array substrate is fabricated by forming the gate and data lines, the switching element, and the pixel electrode by deposition, photolithography and etching a conductive material. Gate and data pads are formed at end portions of the gate and data lines, respectively.

The color filter substrate is fabricated by forming the black matrix at a boundary of the pixel region, the color filter layer in the pixel region and a common electrode on the black matrix and the color filter layer. The array and color filter substrates are attached to each other and a liquid crystal layer interposed between the manufactured array and color filter substrate, thereby obtaining a complete LCD device.

The LCD device uses an electro-optical effect of the liquid crystal determined by the anisotropy of the liquid crystal itself and a state of the molecular arrangement of the liquid crystal. Specifically, control of the molecule arrangement for the liquid crystal affects stability of the image display in the LCD. Therefore, an orientation process is performed to uniformly control an initial arrangement of the liquid crystal molecules.

The orientation process includes printing an orientation film on the substrate and treating a surface of the orientation film to form a polymer chain arranged along a predetermined direction on the orientation film. In printing the orientation film, a polymer such as polyimide of the orientation film is formed on the entire surface of the substrate with a uniform thickness. More specifically, the orientation film is not formed on the entire surface of the substrate, but is actually formed on a region including the liquid crystal layer, such as an active region that displays an image. For example, the orientation film is formed by spin coating on the entire surface of the substrate and then etched to remove a portion of the orientation film corresponding to a non-display region. Therefore, when spin coating is applied to the orientation film formation, a previous patterned transcription plate corresponding to the active region is utilized in order to print the orientation film.

Next, the substrate having the orientation film is maintained in a drying furnace and a hardening furnace for an appropriate time. This removes moisture in the orientation film and permits the film to obtain appropriate hardness. In addition, a surface treatment of the orientation film is performed in order to form a polymer chain arranged along the predetermined direction on the surface of the hardened orientation film by rubbing according to the related art.

Hereinafter, the surface treatment method by rubbing will be explained referring to FIGS. 2A and 2B. FIGS. 2A and 2B are schematic views showing a surface treatment for an orientation film according to rubbing of the related art. In FIGS. 2A and 2B, in order to perform rubbing, a stage 30 movable along a predetermined direction, a rubbing roll 50 having a rolling bar type, and a rubbing rag 55 covering the rubbing roll 50 are provided. For example, the rubbing rag 55 is made of rayon. The rubbing rag 55 has whiskers 57. Alternately, the rubbing roll 50 may be movable along a predetermined direction instead of the stage 30.

At first, a substrate 40 having an orientation film 45 is disposed on the stage 30, and then the rubbing roll 50 is positioned with a gap for the substrate 40. Simultaneously, the rubbing roll 50 rotates with a high speed. At this time, the rubbing rag 55 contacts the surface of the orientation film 45 and is rubbed against the surface of the orientation film 45. Specifically, the polymer chain of the orientation film 45 is arranged along the predetermined direction by rubbing the surface of the orientation film 45 using the rubbing roll 50 having the rubbing rag 55. For instance, by arranging the polymer chain, the orientation film 45 can be oriented along the predetermined direction.

However, the surface treatment of the orientation by rubbing according to the related art has several problems as follows.

Because the whiskers 57 extending from the surface of the rubbing rag 55 fall out through the rubbing, particles may be introduced to the surface of the orientation film 45. Further, minute dust from the rubbing rag 55 may be produced, thereby also introducing particulate into various portions of the substrate 40. Therefore, in order to remove the particles and minute dust from the substrate 40, cleaning and drying process are performed later. As a result of these additional cleaning and drying processes, the manufacturing cost increases.

In addition, static electricity occurs on the substrate 40 when the substrate 40 is rubbed using the rubbing rag 55. This causes electrostatic discharge, which may disconnect neighboring lines from each other or damage the switching elements. Moreover, when the length of the rubbing roll 50 is increased to correspond to a large sized LCD device, the amount of vibration increases dramatically due to eccentricity in the rubbing roll 50 and the high speed used during rubbing. Simultaneously, when the rubbing rag 55 and the substrate 40 contact each other, orientation uniformity is decreased because the pressure between the rubbing rag 55 and the substrate 40 is not uniform, instead being dependent upon the position of the substrate 40 due the severe vibration.

SUMMARY OF THE INVENTION

A method of fabricating a uniform orientation film for a liquid crystal display device is presented in which introduction of minute dust or particles is mitigated.

In one embodiment, a method of fabricating an orientation film includes providing an ion-beam irradiation apparatus having an ion generator and a vacuum chamber including a stage. A liquid crystal display substrate having the orientation film is disposed on the stage. The chamber is evacuated. The orientation film forms a predetermined angle with respect to an ion beam from the ion-beam irradiation apparatus. The angle is controlled by at least one of the ion generator and the stage. The surface of the orientation film is irradiated with the ion beam, which has a predetermined intensity and dose. The substrate including the irradiated orientation film is heated to a predetermined temperature.

In another embodiment, a method of forming a liquid crystal display includes positioning a liquid crystal display substrate having an orientation film on a stage in a vacuum chamber. The orientation film includes main chains and side chains extending from the main chains. The chamber is evacuated. The relative angle of the substrate to an ion beam emitted from the ion-beam irradiation apparatus is set such that the orientation film has a predetermined angle with respect to the ion beam. The surface of the orientation film is irradiated with ions of the ion beam. The ions have enough energy to provide the orientation film with an orientation restriction force sufficient to control an initial alignment of liquid crystal molecules to be applied to the surface. The substrate including the irradiated orientation film is heated to a predetermined temperature.

In another embodiment, a method of forming a liquid crystal display includes positioning a liquid crystal display substrate having an orientation film on a stage in a vacuum chamber. The orientation film includes main chains and side chains extending from the main chains. The chamber is evacuated. The relative angle of the substrate to an ion beam emitted from the ion-beam irradiation apparatus is set such that the orientation film has a predetermined angle with respect to the ion beam. The surface of the orientation film is irradiated with ions of the ion beam. The substrate including the irradiated orientation film is heated to a temperature sufficient to adhere side chains that have broken from the main chains to the orientation film.

In another embodiment, a liquid crystal display substrate contains a substrate suitable for use in a display region of a liquid crystal display and an orientation film disposed on the substrate. The orientation film includes main chains and side chains. A first portion of the side chains extend from the main chains in a particular direction and a second portion of the side chains are attached to the orientation film without extending from the main chains. The orientation film may also contain a thermal polymerization functional group through which the first portion of the side chains pass. The thermal polymerization functional group covers the main chains and the second portion of the side chains is at least partially disposed within the thermal polymerization functional group.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or the like parts.

Figure 1:
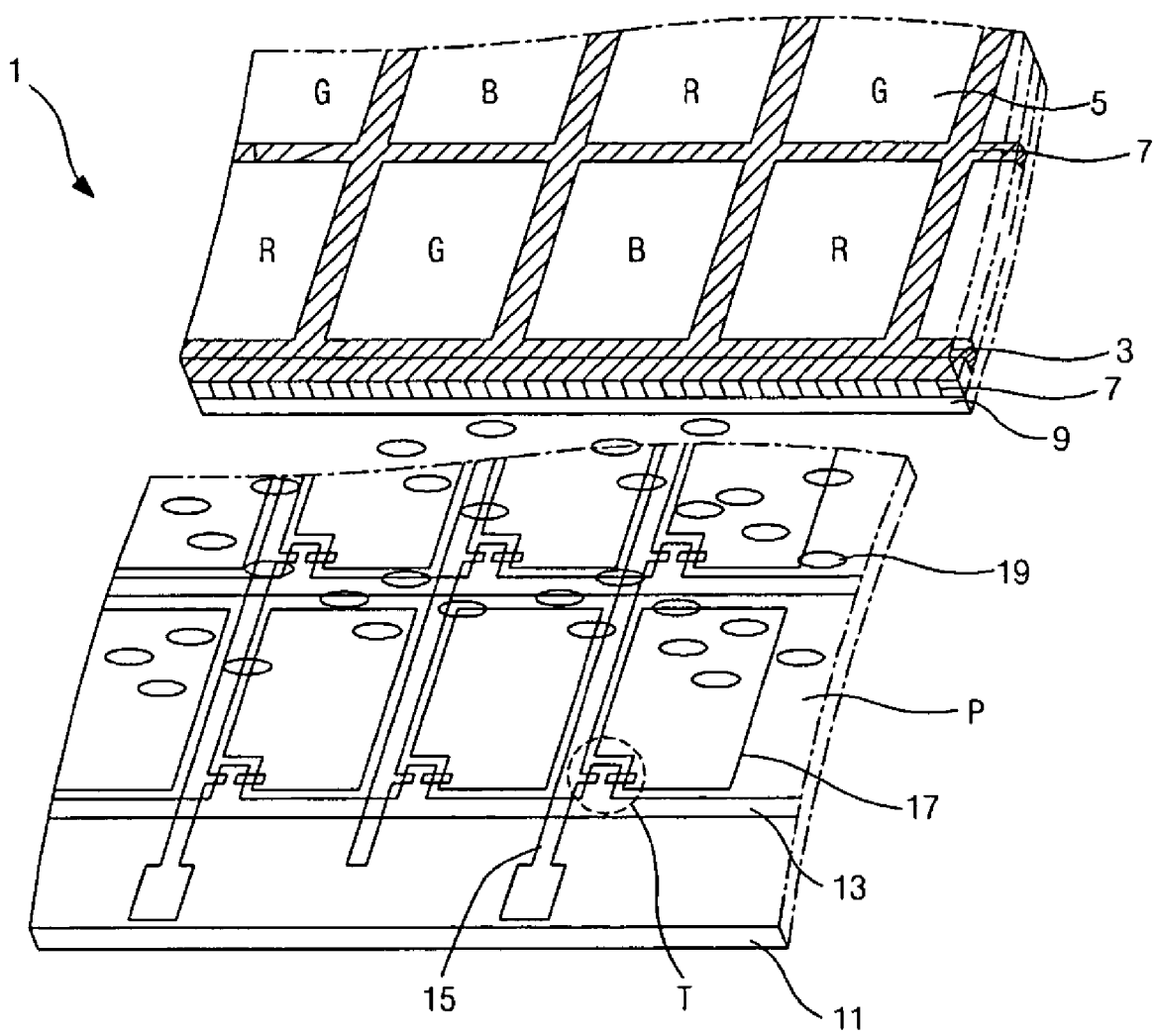
FIG. 1 is a schematic view showing an LCD device according to the related art.
Figure 2A:
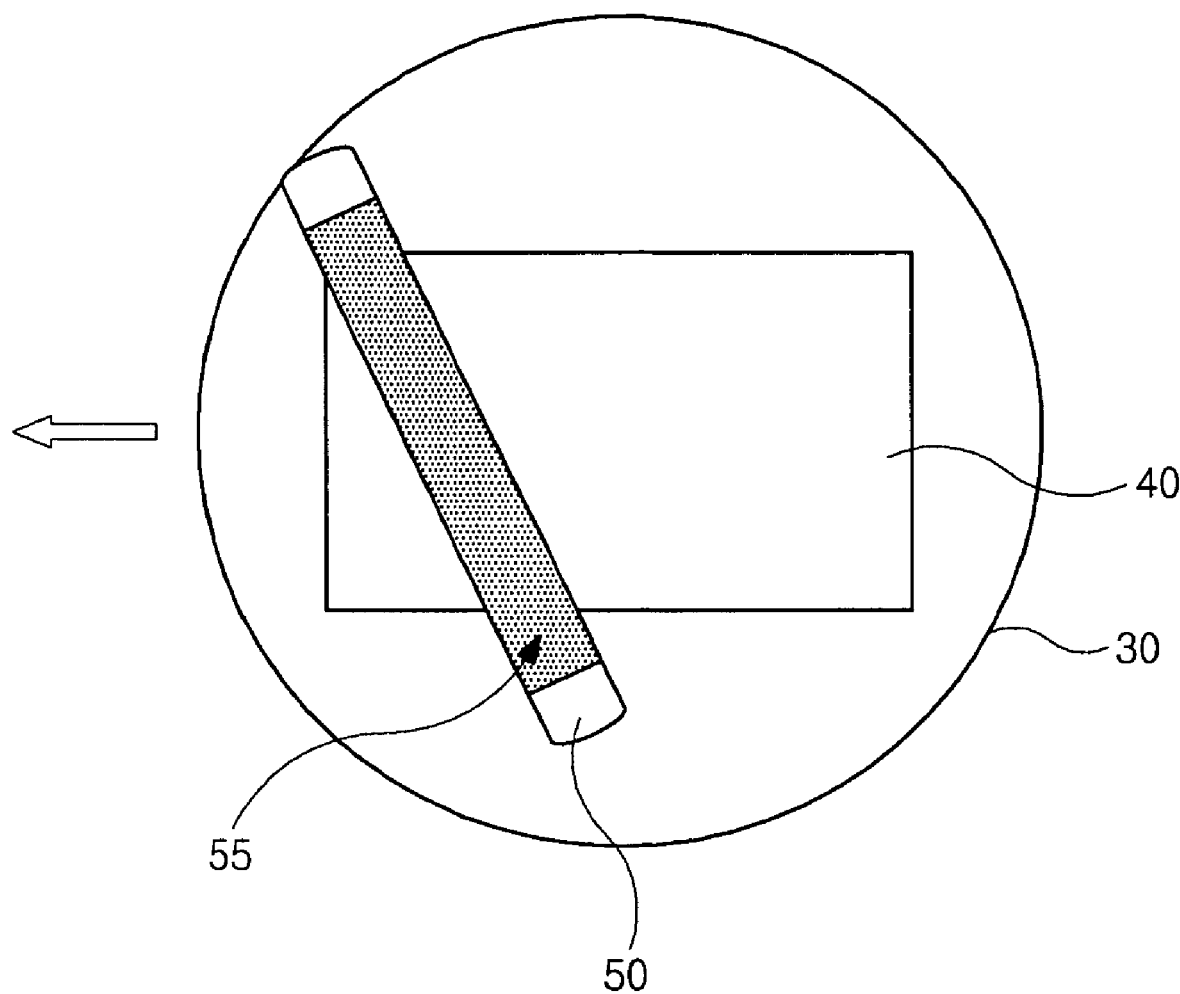
FIGS. 2A and 2B are schematic views showing a process of a surface treatment for an orientation film according to rubbing of the related art.
Figure 2B:
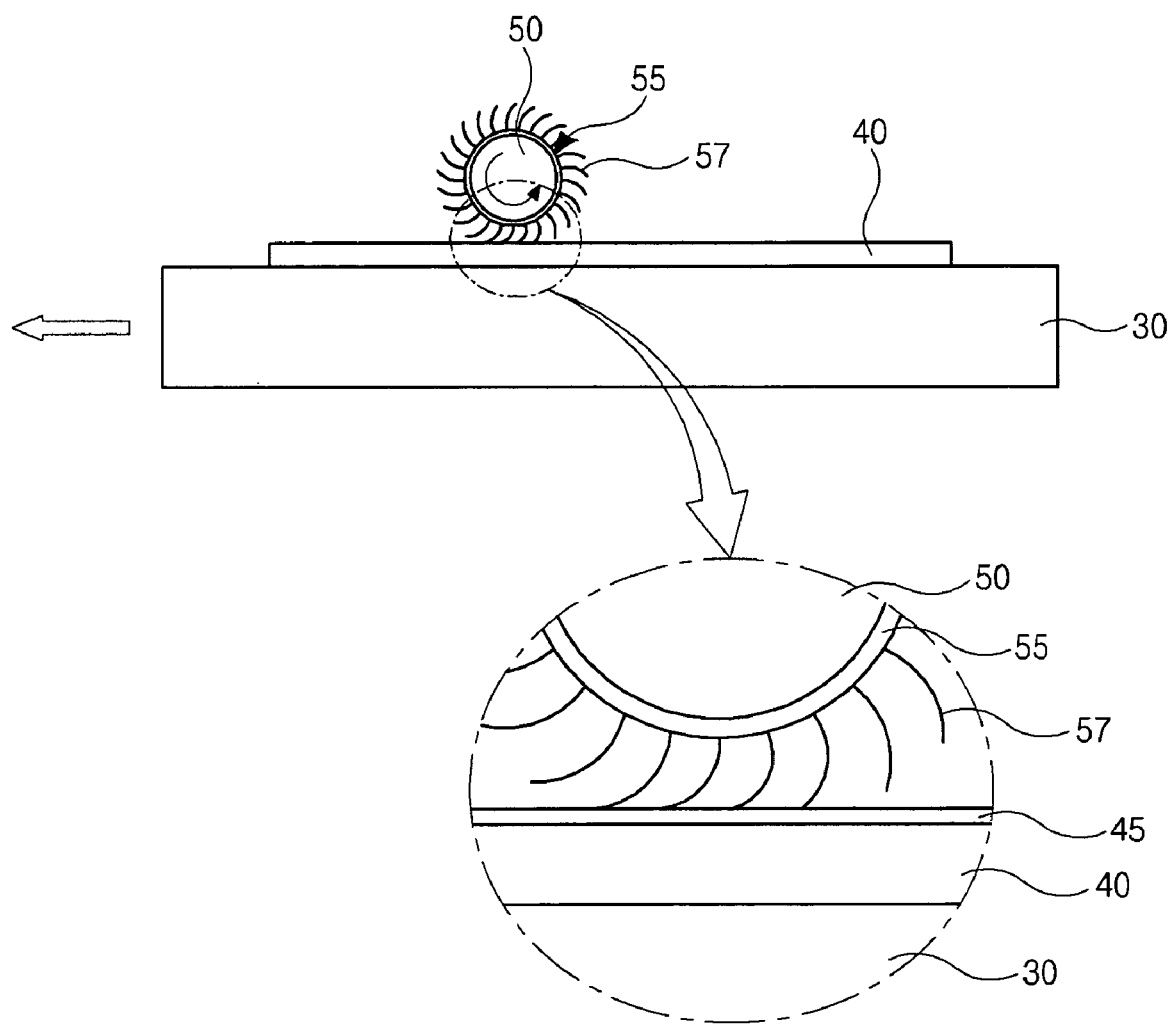
Figure 3A:
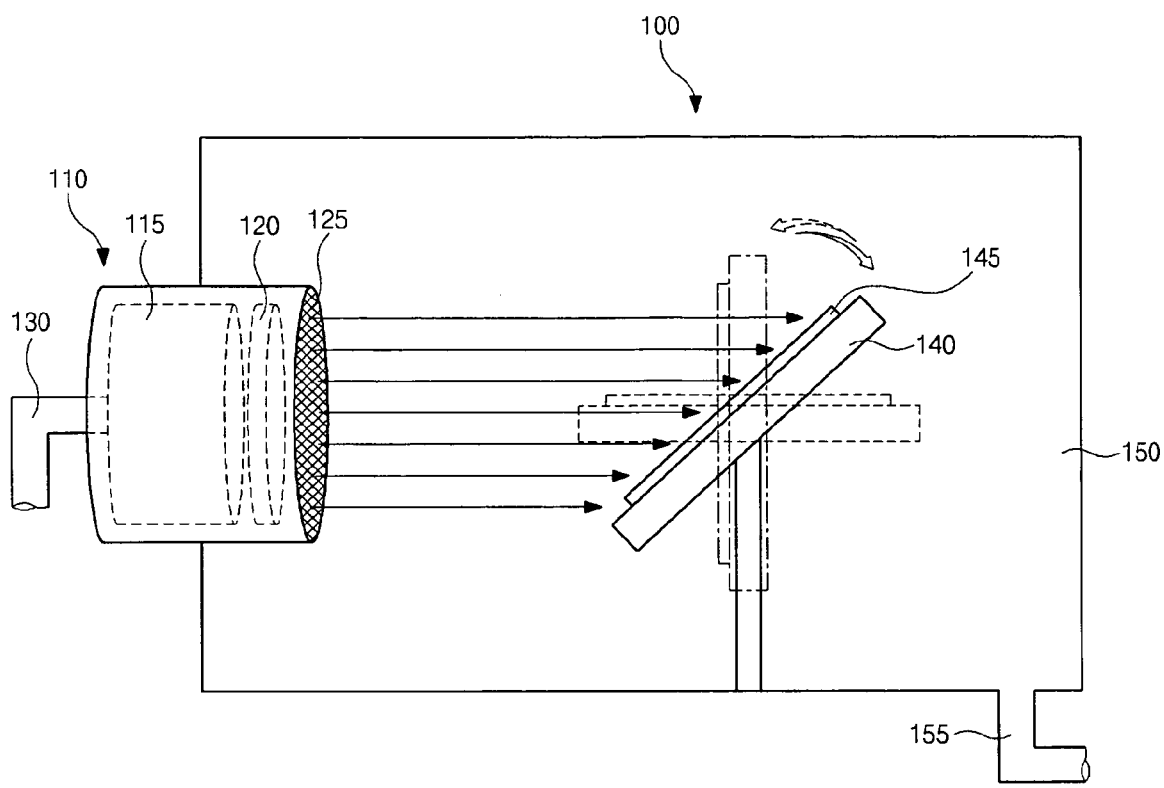
FIGS. 3A and 3B are schematic cross-sectional views showing an ion-beam irradiation apparatus for a surface treatment of an orientation film according to one embodiment of the present invention.
Figure 3B:
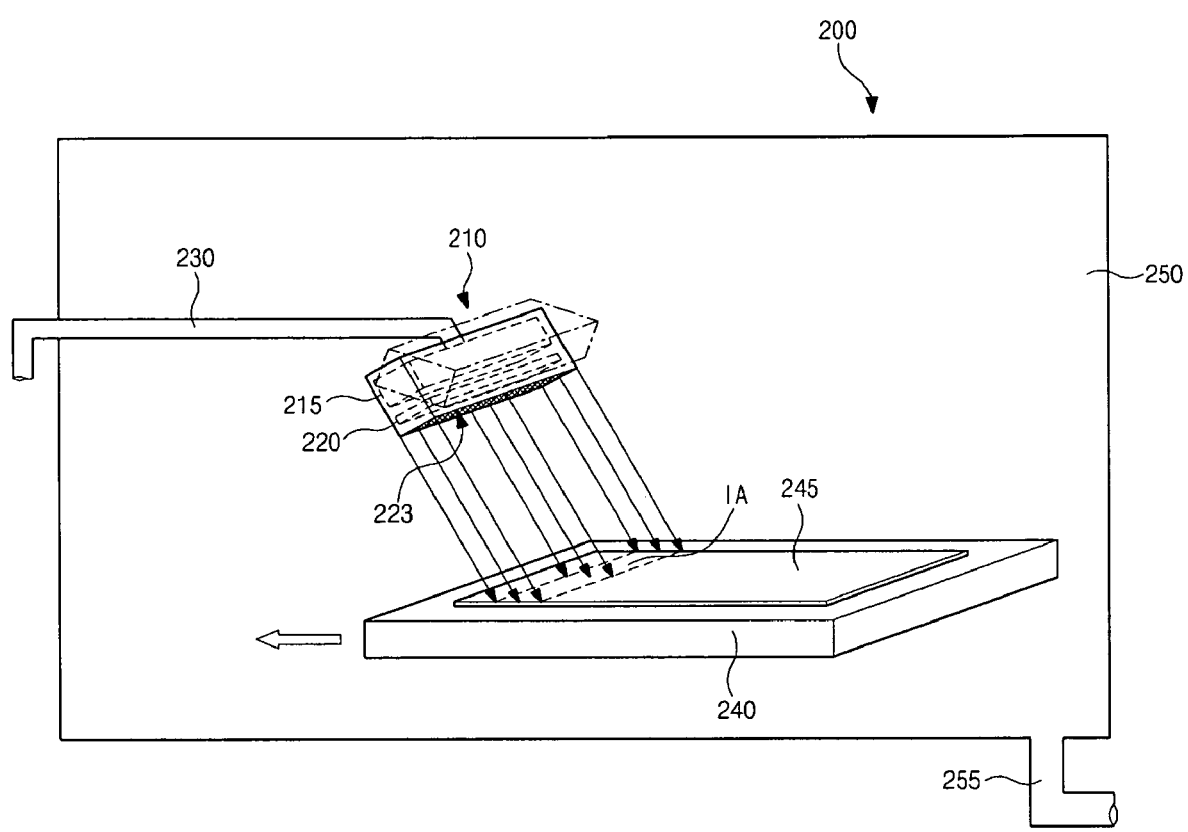

FIGS. 3A and 3B are schematic cross-sectional views showing an ion-beam irradiation apparatus for a surface treatment of an orientation film according to the present invention. FIG. 3A shows an ion-beam irradiation apparatus of which an entire surface of the orientation film is irradiated by one ion-beam irradiation.

FIG. 3B shows an ion-beam irradiation apparatus of which an entire surface of the orientation film is irradiated by several ion-beam irradiations of scanning type.

As shown in FIG. 3A, an ion-beam irradiation apparatus 100 includes a vacuum chamber 150, an ion generator 110 in the chamber 150, and a stage 140 to support a substrate 145. The chamber 150 is connected to a vacuum pump (not shown) substantially to form the vacuum and a vent pipe 155, and the ion generator 110 is connected to a gas supply pipe 130 to supply the ion generator 110 with a gas for ion creation. When the ion beam is present in the chamber 150, the pressure in the chamber 150 is reduced to about $10^{-5}$ torr to about $10^{-3}$ torr.

The ion generator 110 includes a plasma chamber 115 that ionizes the gas, an accelerating electrode 120 that increases the energy and speed of the ions, and an ion-exhaust port 125 comprising a grid structure. The stage 140 can be rotated so that the ions from the ion generator 110 can irradiate the substrate 145 at a desired angle.

Although not shown, an orientation film on the substrate 145 comprising a polymer material includes main chains and side chains that diverge from the main chains. The ion-beam irradiation apparatus 100 rearranges the polymer chains of the orientation film located on the surface of the orientation film by irradiating the entire surface of the substrate 145 with the ion beam for a predetermined time.

However, when the ion-beam irradiation apparatus 100 is applied to a large size substrate, it is difficult for the entire surface of the substrate 145 to be fully irradiated using a single pass by the ion beam. The ion-beam irradiation apparatus 200 in FIG. 3B can applied to an ion-beam orientation for a large size substrate.

The ion-beam irradiation apparatus 200 has a chamber 250 similar to the chamber 150 (of FIG. 3A) the first embodiment, a stage that is parallel with the bottom of the chamber 250, and an ion generator 210 from which ions are ejected at a predetermined angle from the bottom of the chamber 250. The ion generator 210 has an ion-exhaust port 223 from which the ions are ejected. The ion-exhaust port 223 of the ion generator 210 has a width equal to or more than a width of the substrate 245. The stage 240 is movable along one direction at a desired speed, thereby permitting the substrate 245 on the stage 240 to be scanned by the ion-beam and the entire orientation film to be irradiated in a single pass. A region of the substrate 245 which the ion beam irradiates is labeled as ion-beam irradiation region IA. As the stage 240 is moved, the ion-beam irradiation region IA is sequentially moved until the entire surface of the substrate 245 is irradiated with ions at the predetermined angle.

Hereinafter, the ion generator 210 is explained in detail.

The ion generator 210 includes a plasma generator 215, an accelerating electrode 220, and an ion-exhaust port 223. An inert gas is supplied from outside to the ion generator 210 using a gas port 230. The gas ionizes and plasma is generated by applying a high pressure and electric field to the gas in the plasma generator 215. The inert gases include at least one of helium (He), neon (Ne), argon (Ar), krypton (Kr) and xenon (Xe). Ar, for example, may be selected as it is the cheapest gas. The ions in the plasma generator 215 are accelerated by the accelerating electrode 220 and give a predetermined energy. Ions having the desired energy are ejected into the chamber 250 through the grid type ion-exhaust port 223. As the ions impinge upon the orientation film (not shown), the surface of the orientation film is changed. The ions in the chamber 250 are removed to the outside through a vent pipe 255 connected to a vacuum pump (not shown).

Hereinafter, a surface treatment for an orientation film using the mentioned ion-beam irradiation apparatus will be explained.

Figure 4A:
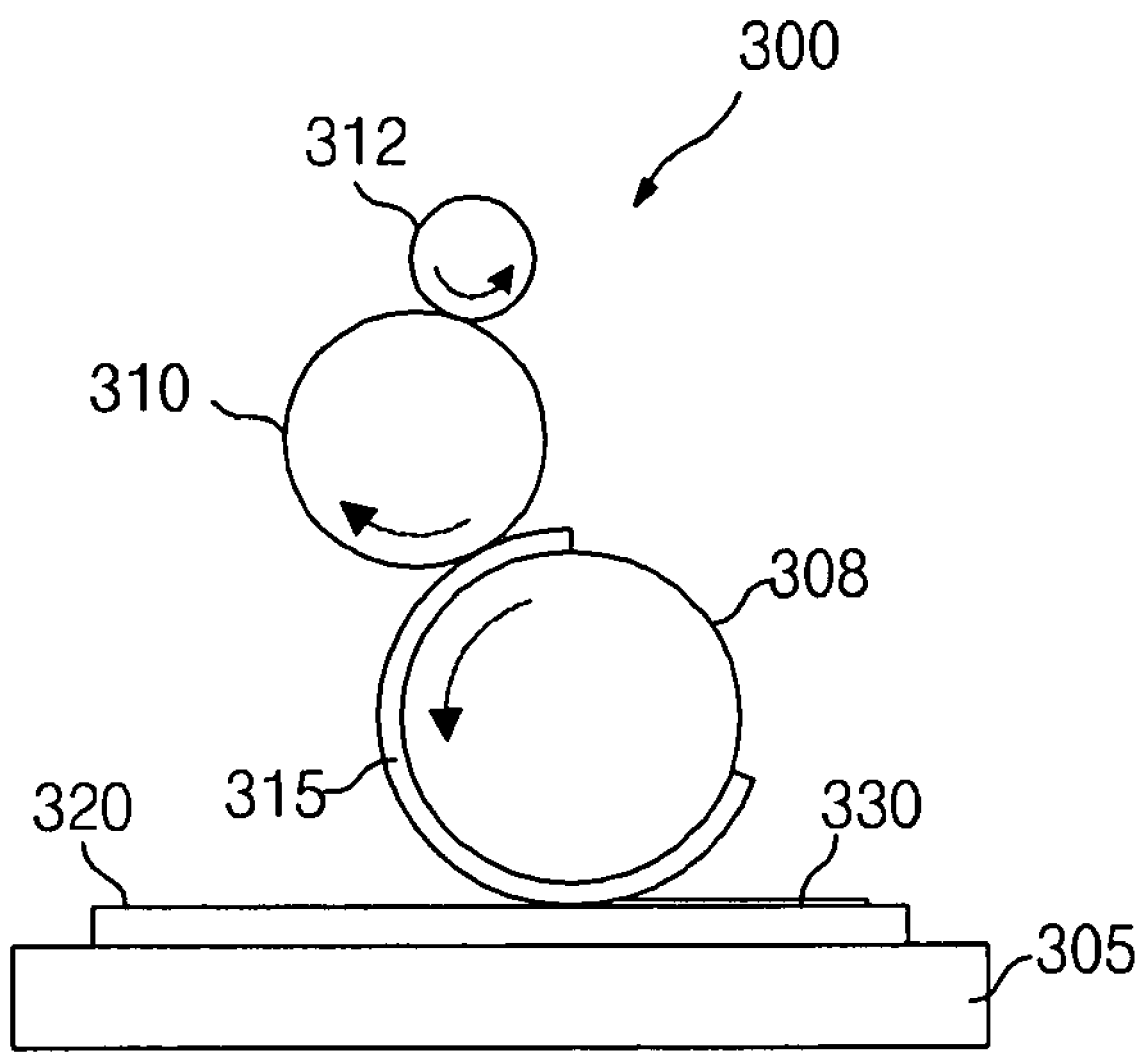
FIGS. 4A and 4B are schematic views showing surface treatment of an orientation film according to a first embodiment of the present invention.
Figure 4B:
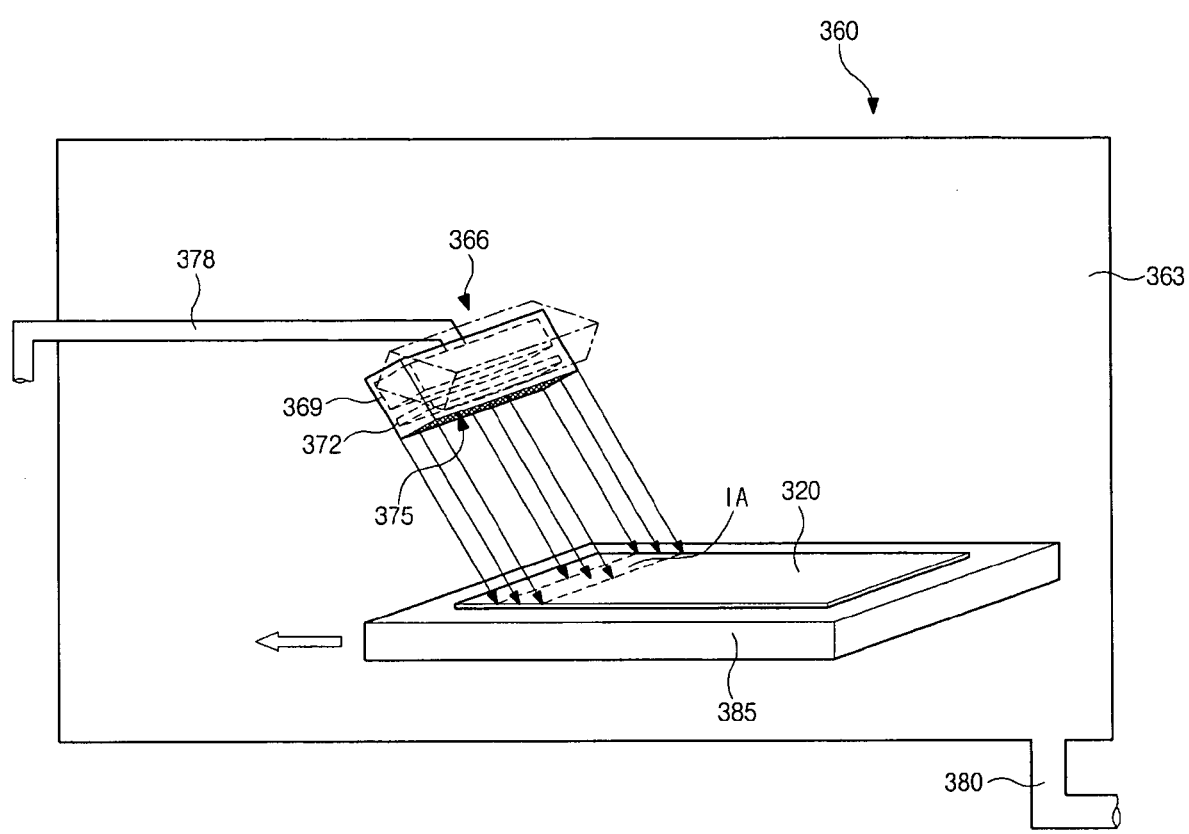

FIGS. 4A and 4B are schematic views showing a process of a surface treatment of an orientation film according to a first embodiment of the present invention. FIGS. 5A to 5D are schematic views showing transformation of an orientation film by the process of the surface treatment of FIGS. 4A and 4B according to the present invention. For convenience, the orientation film is shown only positioned on a substrate without any elements.

FIG. 4A, an orientation film 330 is formed on a substrate 320. For example, the substrate 320 corresponds to an array substrate that includes a switching element and a pixel electrode, and to a color filter substrate that includes a color filter layer and a common electrode. The orientation film 330 includes one of a macro-molecular inorganic material and a polymer. For example, the polymer is a polyimide.

When the orientation film 330 is formed using polyimide, as shown in FIG. 4A, the orientation film 330 is formed as a predetermined pattern by printing the polyimide using an orientation-film printing apparatus 300 that includes a doctor roll 312, an anirox roll 310, a transcription plate 315, an attachment roll 308 of the transcription plate 315, and a stage 305. The transcription plate 315 is attached to the attachment roll 308 and is patterned to form the orientation film pattern. Next, sequentially by maintaining the orientation film 330 for a predetermined time in a drying furnace and a hardening furnace heated at a set temperature, the orientation film 330 is cured to achieve the desired thickness and hardness. For example, the orientation film 330 has a thickness within about 500Å to about 1000Å after curing.

Figure 5A:
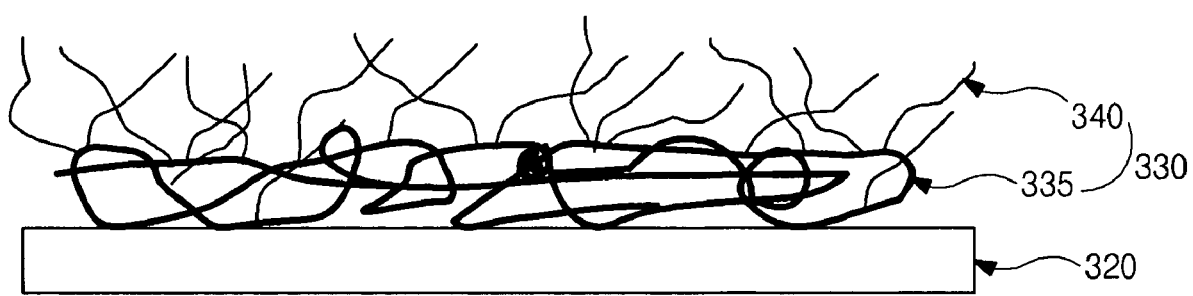
FIGS. 5A to 5D are schematic views showing transformation of an orientation film by the surface treatment of FIGS. 4A and 4B according to the present invention.
Figure 5B:
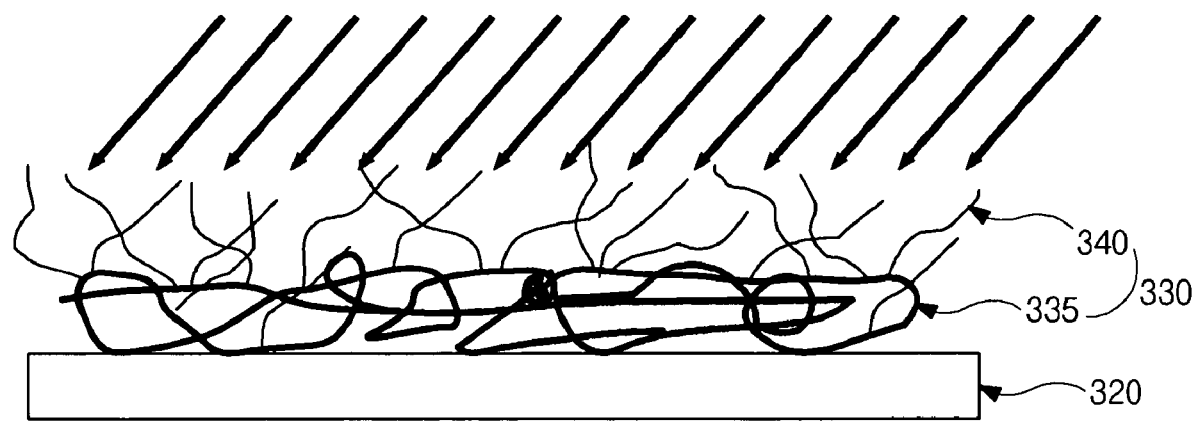

In FIG. 5A, an orientation film 330 includes main chains 335 that are entangled in a complicated manner and side chains 340 that diverge from the main chains 335 without a particular direction. In FIGS. 4B and 5B, an ion beam from an ion-beam irradiation apparatus 360 is irradiated onto a surface of the orientation film 330 including the main chains 335 and the side chains 340.

The ion-beam irradiation apparatus 360 includes a vacuum chamber 363, an ion generator 366 in the chamber 363, and a stage 385 to support a substrate 320. When the substrate 320 having the orientation film 330 is disposed on the stage 385 in the chamber 363, air in the chamber 363 is removed from the chamber 363 through the vacuum pipe (not shown) and a vacuum of about $10^{-5}$ torr to about $10^{-3}$ torr is created in the chamber 363. The ion generator 366 includes a plasma generator 369, an accelerating electrode 372, and an ion-exhaust port 375.

An inert gas is injected to the ion generator 366 through the gas supply pipe 378 in the chamber 363. The injected gas is ionized by the plasma generator 369 of the ion generator 366. The ionized ions are ejected through the ion-exhaust port 375. The ejected ions are given a predetermined energy and a specific angle with regard to the substrate 320 by the accelerating electrode 372. The ion beam from the ion-exhaust port 375 irradiates the orientation film 330 of the substrate 320 at the specific angle dependent on the positions of the stage 385 and the ion-exhaust port 375. The ion beam has a dose of about $5 \times 10^{15}$ N/cm$^2$ to about $5 \times 10^{16}$ N/cm$^2$. For example, the ions of the ion beam have an energy of about 300eV to about 800eV.

Figure 5C:
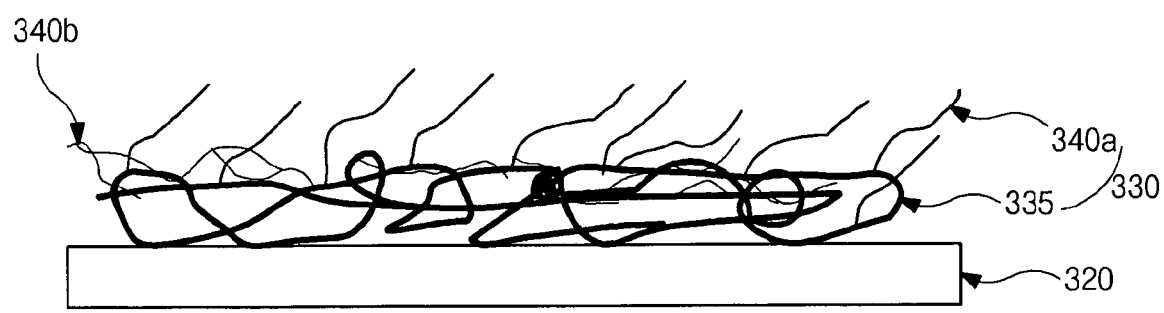

FIG. 5C is a schematic cross-sectional view showing an orientation film that has been irradiated by an ion beam. The side chains 340 include first side chains 340a that have a similar angle as the irradiation angle of the ion beam. During irradiation, the first side chains 340a maintain their state. The side chains 340 also include second side chains 340b which do not have a similar angle as the irradiation angle. The second side chains 340b become entangled with the main chains 335 or become separated from the main chains 335 after being irradiated. Therefore, only the first side chains 340a, which are parallel to the ion beam, remain after irradiation. As a result, the surface of the orientation film 330 has a predetermined orientation direction determined by the first side chains 340a.

Generally, when the anchoring energy of an orientation film is greater than $10^{-4} J/m^2$, it is not difficult to produce an initial orientation of the liquid crystal later in contact with the orientation film. Anchoring energy is the orientation restriction force in order to produce an initial orientation of a liquid crystal. The anchoring energy of the orientation film 330 can be adjusted to be greater than $10^{-4}$ $J/m^2$ by controlling the energy intensity of the ion beam. Therefore, control of the initial orientation of the liquid crystal is relatively easy.

Next, although not shown, the surface treatment process is performed for the array substrate and the color filer substrate. For instance, the substrate having the mentioned orientation film may correspond to one of the array substrate and the color filter substrate. For example, fabrication of the LCD panel includes forming a seal pattern on one of the array substrate and the color filter substrate after the surface treatment of the orientation film. Next, an LCD panel is manufactured by injecting the liquid crystal between the array substrate and the color filter substrate.

Figure 5D:
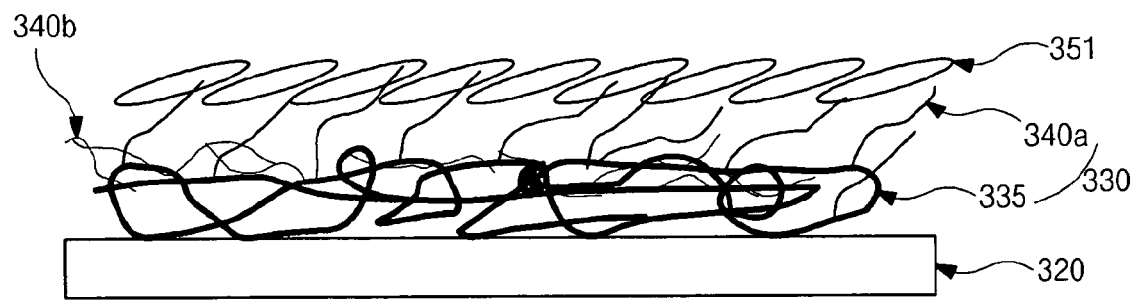

In FIG. 5D, a liquid crystal layer is formed on the substrate on which the surface treatment has been performed. As shown, liquid crystal molecules 351 of the liquid crystal layer are arranged along one direction by the first side chains 340a of the orientation film 330. However, because the second side chains 340b may become entangled with or separated from the main chains 335, the first side chains 340a may be affected by the second side chains 340b. Therefore, an arrangement state of the first side chains 340a may be badly transformed or the side chains 340 cut from the main chains 335 may act as impurities for the liquid crystal layer by being absorbed into the liquid crystal layer.

Figure 6A:
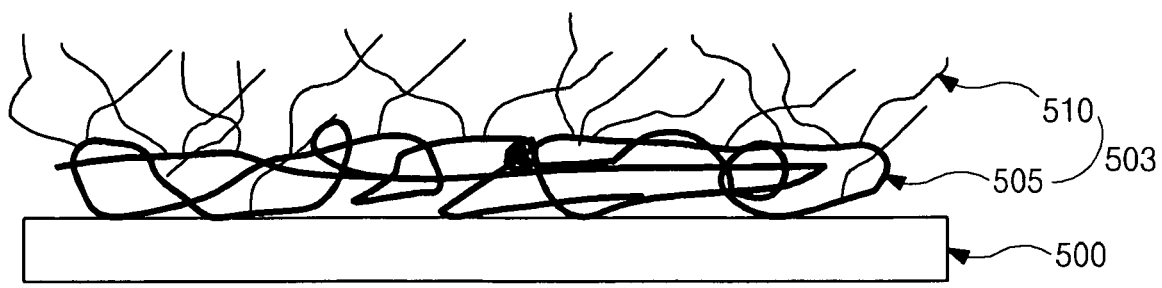
FIGS. 6A and 6B are schematic cross-sectional views after forming an orientation film of a general polymer and an orientation film of a polymer having a thermal polymerization functional group, respectively.
Figure 6B:
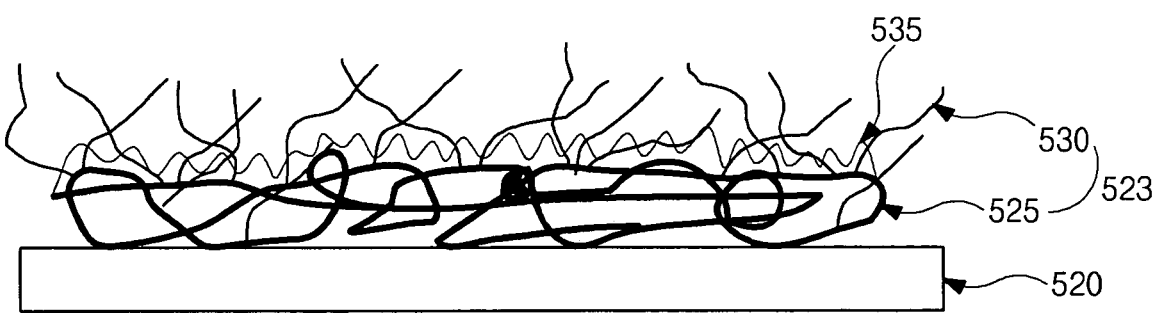

FIGS. 6A and 6B are schematic cross-sectional views after forming an orientation film of a general polymer and an orientation film of a polymer having a thermal polymerization functional group, respectively. In FIG. 6A, when an orientation film 503 is formed with a general polymer, main chains 550 of the orientation film 503 are entangled with each other and side chains 510 are arranged in a disordered state and diverge from the main chains 550. On the other hand, referring to FIG. 5B, when an orientation film 523 is formed with a polymer including a thermal polymerization functional group 535, main chains 525 of the orientation film 523 entangled with each other form a base element. At this time, the thermal polymerization functional group 535 covers the main chains 525 and the side chains 530. In other words, the thermal polymerization functional group 535 is positioned between the main chains 525 and the side chains 530. As shown, the side chains 530 are arranged without a predetermined direction and pass through the thermal polymerization functional group 535.

Hereinafter, a surface treatment method of an orientation film modified the first embodiment according to the present invention referring to FIGS. 7A to 7C and FIGS. 8A to 8E.

Figure 7A:
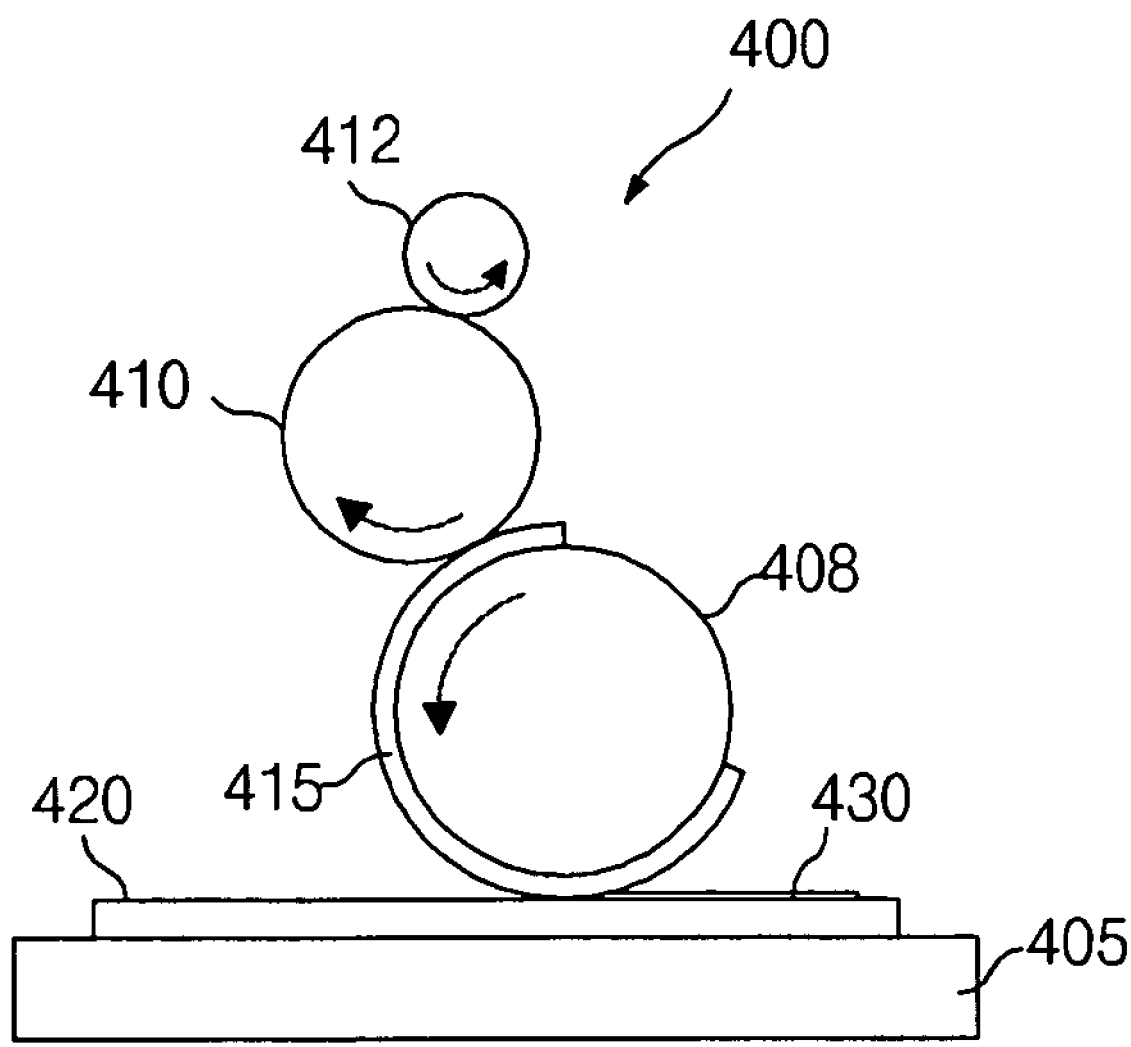
FIGS. 7A to 7C are schematic views showing a surface treatment of an orientation film according to a second embodiment of the present invention.
Figure 7B:
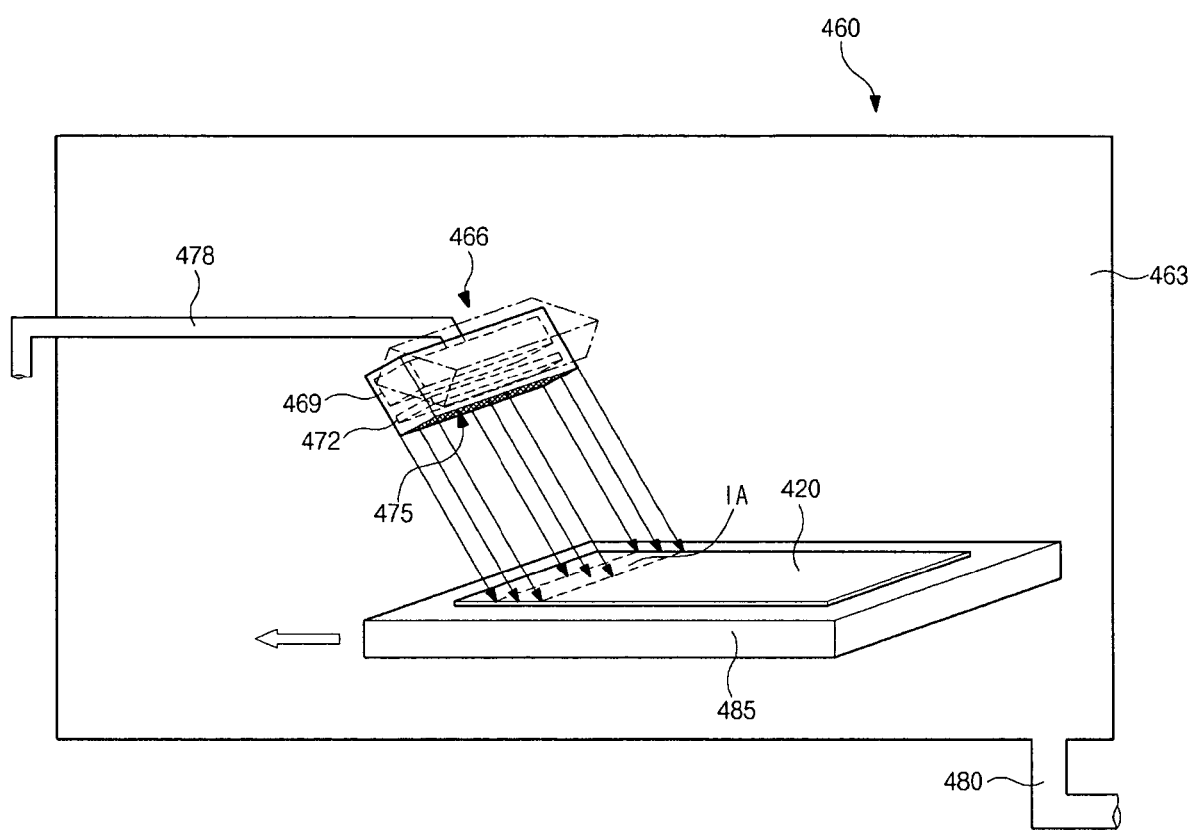
Figure 7C:
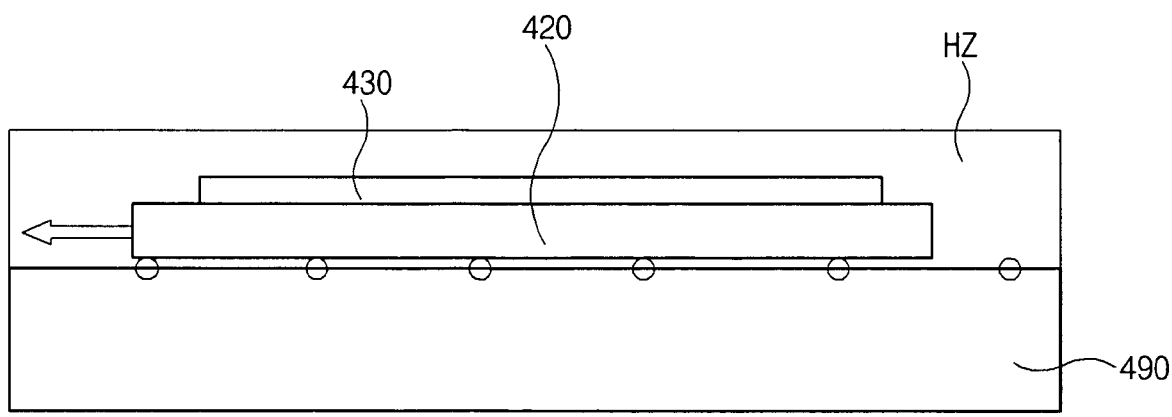

FIGS. 7A to 7C are schematic views showing surface treatment of an orientation film according to a second embodiment of the present invention. FIGS. 8A to 8E are schematic views showing transformation of an orientation film according to the second embodiment of FIGS. 7A to 7C of the present invention. For convenience, only the orientation film is shown on a substrate without any elements such as an array element or a color filter.

In FIG. 7A, an orientation film 430 is formed by printing a macro-molecular inorganic material and/or a polymer using a printing apparatus 400 of the orientation film 430 on a substrate 420. Although not shown, the substrate 420 includes a switching element or a color filter layer. In addition, the orientation film includes main chains and side chains that diverge from the main chains. Further, the orientation film 430 may include a thermal polymerization functional group covering the main chains. For example, the thermal polymerization functional group includes an acryl. The orientation film 430 includes a polymer that may contain an acryl as the thermal polymerization functional group.

When the orientation film is formed by printing, specifically, the orientation film is formed with a polyimide that may contain an acryl on the substrate using the printing apparatus of the orientation film and/or a patterned transcription plate. The orientation film 430 is formed as a predetermined pattern by printing the polyimide using an orientation-film printing apparatus 400 that includes a doctor roll 412, an anirox roll 410, a transcription plate 415, an attachment roll 408 of the transcription plate 415, and a stage 405. The transcription plate 415 is attached to the attachment roll 408 and is patterned to form the orientation film pattern. After printing the orientation film 430, the orientation film 430 is cured so that it achieves a desired thickness of about 500Å to about 1000Å by maintaining the orientation film 430 for a predetermined time in a drying furnace (not shown) and a hardening furnace (not shown) heated for a set time.

Figure 8A:
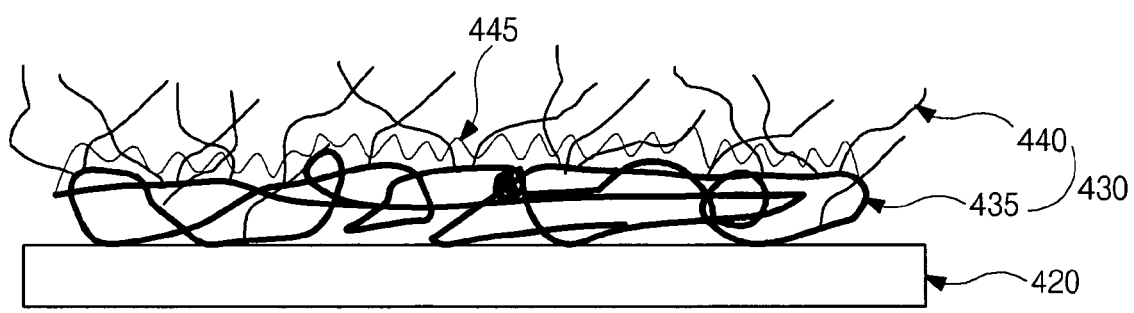
FIGS. 8A to 8E are schematic views showing transformation of an orientation film according to the second embodiment of FIGS. 7A to 7C of the present invention.

FIG. 8A is a cross-sectional view of the orientation film after fabricating the orientation film of FIG. 7A. In FIG. 8A, after printing and curing the orientation film 430, the thermal polymerization functional group 445 is positioned between the main chains 435 and the side chains 440 in the orientation film 430. In other words, the thermal polymerization functional group 445 covers the main chains 435. The side chains 430 that diverge from the main chains 445 pass through the thermal polymerization functional group 445.

Figure 8B:
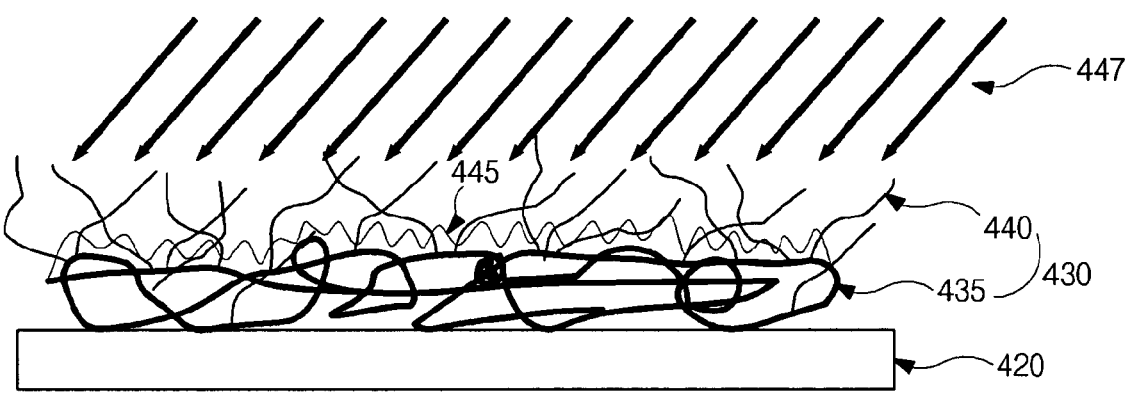

Next, as shown in FIGS. 7B and 8B, a controlled ion beam irradiates the substrate 420 at the desired angle such that the entire surface of the orientation film 430 having the main chains 435 and the side chains 440. The conditions (e.g. vacuum, ion energy, ion dose) under which the ion-beam irradiation apparatus 460 irradiates the orientation film 430 may be similar to those of the first embodiment of the present invention.

Figure 8C:
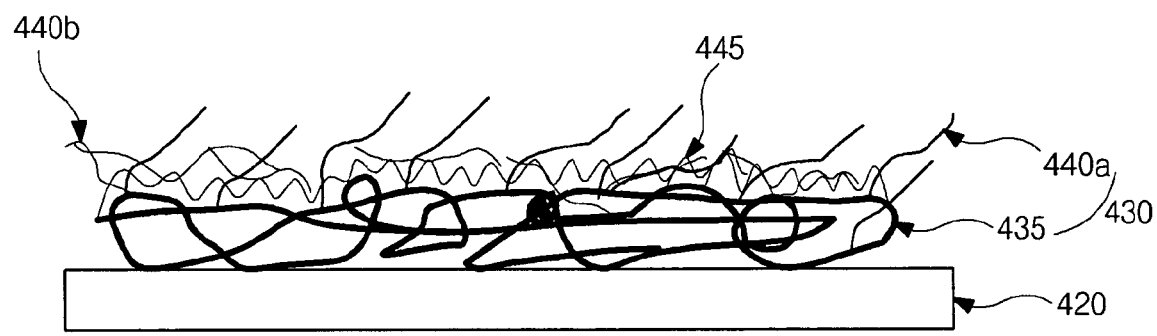

FIG. 8C is a cross-sectional view of the orientation film after irradiating the ion beam of FIG. 7B according to the present invention. In FIG. 8C, first side chains 440a having a similar angle as the irradiation angle of the ion beam maintain their orientation state. Second side chains 440b having a substantially different angle from the irradiation angle of the ion beam become entangled with the main chains 435 or form a pile on the thermal polymerization functional group 445 without connecting to the main chains 435. As a result, the first side chains 440a that diverge from the main chains 435 and are parallel with the irradiated ion beam remain on the surface of the orientation film 430. Accordingly, the orientation film 430 has a predetermined direction determined by the first side chains 440a.

However, after injecting a liquid crystal (not shown) between the substrates having the orientation film, the side chains 440b that have been separated from the main chains 435 due to the irradiation of the ion beam and side chains having a weak coherence with the main chains 435 affect the first side chains 440a. The pretilt angle of the liquid crystal (not shown) is thus affected due to the presence of the side chains 440b and absorption of the side chains separated from the main chains 435 in the liquid crystal. As a result, the liquid crystal layer may become polluted because of the separated side chains 440b.

To solve the problem, as shown in FIG. 7C, thermal treatment of the orientation film 430 is performed for a set time. For example, the thermal treatment includes passing the orientation film 430 through a hot plate type hardening zone at the desired temperature for a set time, or heating the orientation film 430 for a set time in a hardening furnace having a predetermined temperature.

The thermal-treatment temperature in the hardening zone and/or the hardening furnace is less than a glass transition temperature Tg and is more than a polymerization temperature. The glass transition temperature Tg is the temperature at which the main chains and the side chains are broken. The polymerization temperature is the temperature at which polymerization of the thermal polymerization functional group occurs when the orientation film is formed with polyimide. Generally, because the glass transition temperature of the polyimide is about 300° C., the thermal treatment temperature is less than about 300° C. The thermal polymerization temperature of the thermal polymerization functional group is lower than Tg in general. The thermal polymerization temperature varies in accordance with the kind of the thermal polymerization functional group. For example, as the transformation of acryl occurs at about 150° C., the treatment temperature of the polyimide including acryl as the thermal polymerization functional group is about 150° C. to about 300° C. Accordingly, the orientation film is heated to a temperature less than the glass transition temperature and more than the polymerization temperature.

Figure 8D:
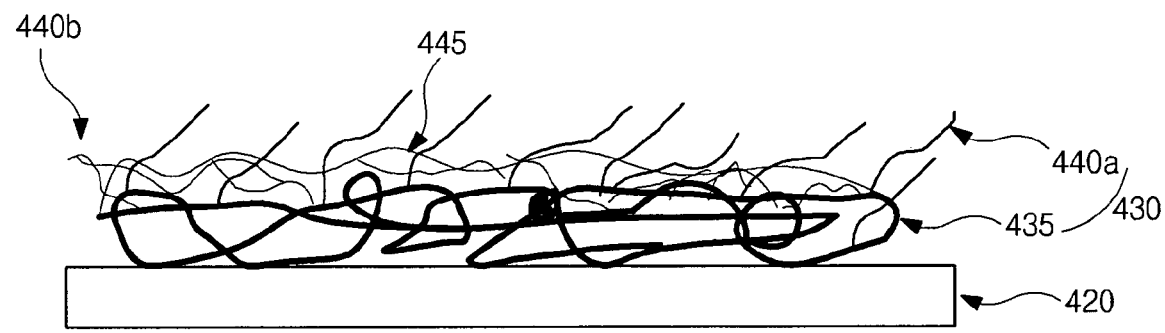

FIG. 8D is a cross-sectional view of the orientation film after thermal treatment of FIG. 7C according to the present invention. In FIG. 8D, the thermal polymerization functional group 445 has been heated on the hot plate 490 and has undergone a phase change. The side chains 440b piled on the thermal polymerization functional group 445 are absorbed into the phase-changed thermal polymerization functional group 445 or are hardened into an attached and fixed state on the thermal polymerization functional group 445. This prevents the piled and entangled side chains 440b from being absorbed into the liquid crystal layer and from significantly affecting the initial arrangement state of the liquid crystal molecules of the liquid crystal layer. Alternatively, when the orientation film is formed with a polymer that does not possess the thermal polymerization functional group, the side chains separated from the main chains by irradiation of the ion beam may be attached to the main chains during thermal treatment to again prevent the side chains from being absorbed into the liquid crystal layer and from significantly affecting the initial arrangement state of the liquid crystal molecules of the liquid crystal layer.

Figure 8E:
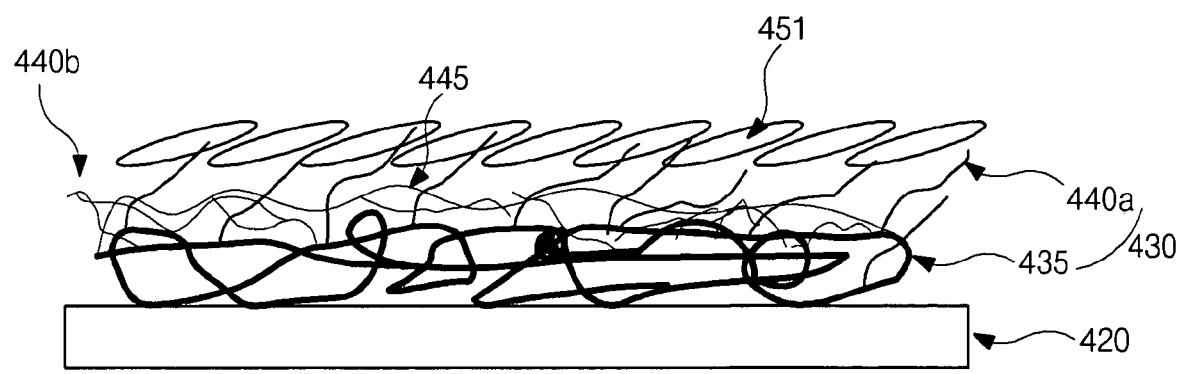

Next, although not shown, for example, the substrate containing the irradiated surface-treated orientation film is attached using a seal pattern to another substrate. Liquid crystal is then injected into the sealed substrates to form a liquid crystal panel. FIG. 8E is a cross-sectional view showing the surface of the substrate after thermal treatment and including a liquid crystal layer on the substrate. In FIG. 8E, the liquid crystal molecules are arranged along one direction by the side chains arranged along a predetermined direction.

The method of fabricating the orientation film according to the present invention includes irradiating the orientation film with a desired energy and thermally treating the irradiated orientation film. A sufficient orientation restriction force to set the initial alignment of liquid crystal molecules that contact the orientation film can be obtained. In addition, problems due to particles and static electricity generated through rubbing are avoided. Further, uniform orientation without reduction of the orientation uniformity for a large size substrate can be obtained. In addition, much stabler orientation state can be obtained by performing a thermal treatment process after irradiating the orientation film with the ion beam.

It will be apparent to those skilled in the art that various modifications and variations can be made in the liquid crystal display devices of the present invention without departing from the spirit or scope of the invention. Thus, it is intended that the present invention covers the modifications and variations of this invention provided they come within the scope of the appended claims and their equivalents.

What is claimed is:

1. A liquid crystal display substrate comprising:
a substrate suitable for use in a display region of a liquid crystal display; and
an orientation film disposed on the substrate, the orientation film including main chains and side chains, a first portion of the side chains extending from the main chains in a particular direction and a second portion of the side chains attached to the orientation film without extending from the main chains.

2. The substrate according to claim 1, wherein the orientation film further includes a thermal polymerization functional group through which the first portion of the side chains pass, the thermal polymerization functional group covering the main chains, the second portion of the side chains at least partially disposed within the thermal polymerization functional group.

3. A method of fabricating an orientation film, the method comprising:
providing an ion-beam irradiation apparatus having an ion generator and a vacuum chamber including a stage;
disposing a liquid crystal display substrate having the orientation film on the stage;
evacuating the chamber;
controlling an angle of the substrate such that the orientation film forms an angle with respect to an ion beam from the ion-beam irradiation apparatus, the angle being controlled by at least one of the ion generator and the stage;
irradiating a surface of the orientation film with the ion beam, the ion beam having an intensity and dose; and
heating the substrate including the irradiated orientation film.

4. The method according to claim 1, wherein the chamber is evacuated to a vacuum of about $10^{-5}$ torr to about $10^{-3}$ torr.

5. The method according to claim 1, wherein the dose is about $5 \times 10^{15}$ N/cm$^2$ to about $5 \times 10^{16}$ N/cm$^2$.

6. The method according to claim 1, wherein the energy of each ion of the ion beam is about 300eV to about 800eV.

7. The method according to claim 1, wherein the orientation film includes at least one of a macro-molecular inorganic material and a polymer.

8. The method according to claim 7, wherein the orientation film includes a plurality of main chains and a plurality of side chains that diverge from the main chains, the plurality of side chains arranged along a particular direction.

9. The method according to claim 8, wherein the orientation film further includes a thermal polymerization functional group through which the side chains pass, the thermal polymerization functional group covering the plurality of the main chains.

10. The method according to claim 9, wherein the thermal polymerization functional group includes acryl.

11. The method according to claim 9, wherein the heating includes maintaining the substrate on a hot plate or in a hardening furnace.

12. The method according to claim 11, wherein the substrate including the irradiated orientation film is heated to a temperature that is less than a glass transition temperature of the orientation film.

13. The method according to claim 12, wherein the glass transition temperature is about 300° C.

14. The method according to claim 11, wherein the substrate including the irradiated orientation film is heated to a temperature is more than a polymerization temperature of the thermal polymerization functional group.

15. The method according to claim 14, wherein the polymerization temperature of the thermal polymerization functional group is about 150° C.

16. The method according to claim 7, wherein the polymer is a polyimide.

17. The method according to claim 1, wherein the orientation film has an orientation restriction force more than about $10^{-4}$ J/m$^2$.

18. The method according to claim 1, further comprising forming the orientation film on the substrate.

19. A method of forming a liquid crystal display, the method comprising:
    positioning a liquid crystal display substrate having an orientation film thereon on a stage in a vacuum chamber, the orientation film including main chains and side chains extending from the main chains;
    evacuating the chamber;
    setting a relative angle of the substrate to an ion beam emitted from the ion-beam irradiation apparatus, the orientation film being set at an angle with respect to the ion beam;
    irradiating a surface of the orientation film with ions of the ion beam, the ions having enough energy to provide the orientation film with an orientation restriction force sufficient to control an initial alignment of liquid crystal molecules to be applied to the surface; and
    heating the substrate including the irradiated orientation.

20. The method according to claim 19, wherein a portion of the side chains broken by the irradiation is fixed to the orientation film during the heating of the substrate.

21. The method according to claim 19, wherein the orientation film further includes a thermal polymerization function group through which the side chains pass, the thermal polymerization function group covering the plurality of the main chains.

22. The method according to claim 21, wherein the substrate including the irradiated orientation film is heated to a temperature that is more than a polymerization temperature of the thermal polymerization functional group.

23. The method according to claim 22, wherein the substrate including the irradiated orientation film is heated to a temperature that is less than a glass transition temperature of the orientation film.

24. The method according to claim 21, wherein a portion of the side chains broken by the irradiation and disposed on the thermal polymerization functional group are absorbed by the thermal polymerization functional group during the heating of the substrate.

25. The method according to claim 19, wherein the heating includes maintaining the substrate on a hot plate or in a hardening furnace.

26. The method according to claim 19, further comprising forming the orientation film on the substrate.

27. The method according to claim 19, further comprising attaching another substrate to the substrate having the orientation film after irradiation of the orientation film without cleaning the substrate having the orientation film between irradiation of the orientation film and attachment of the other substrate.

28. The method according to claim 27, further comprising adding liquid crystal molecules between the substrates after attaching the substrates.

29. A method of forming a liquid crystal display, the method comprising:
    positioning a liquid crystal display substrate having an orientation film thereon on a stage in a vacuum chamber, the orientation film including main chains and side chains extending from the main chains;
    evacuating the chamber;
    setting a relative angle of the substrate to an ion beam emitted from the ion-beam irradiation apparatus;
    irradiating a surface of the orientation film with ions of the ion beam; and
    heating the substrate including the irradiated orientation film to a temperature sufficient to adhere side chains that have broken from the main chains to the orientation film.

30. The method according to claim 29, wherein the orientation film further includes a thermal polymerization functional group through which the side chains pass, the thermal polymerization functional group covering the main chains.

31. The method according to claim 30, wherein the temperature is more than a polymerization temperature of the thermal polymerization functional group.

32. The method according to claim 31, wherein the temperature is less than a glass transition temperature Tg of the orientation film.

33. The method according to claim 29, wherein the broken side chains disposed on the thermal polymerization functional group are absorbed by the thermal polymerization functional group during the heating of the substrate.

* * * * *